(12) United States Patent
Li et al.

(10) Patent No.: US 12,163,302 B2
(45) Date of Patent: Dec. 10, 2024

(54) TOOL FOR OFFSHORE WIND POWER FOUNDATION PILE AND METHOD FOR USING SAME

(71) Applicant: Shanghai Investigation, Design & Research Institute Co., Ltd., Shanghai (CN)

(72) Inventors: Jialong Li, Shanghai (CN); Ke Fan, Shanghai (CN); Xin Yang, Shanghai (CN); Juan Jiang, Shanghai (CN); Jiandong Xiao, Shanghai (CN); Xu Zhang, Shanghai (CN)

(73) Assignee: Shanghai Investigation, Design & Research Institute Co., Ltd., Shanghai (CN)

( * ) Notice: Subject to any disclaimer, the term of this patent is extended or adjusted under 35 U.S.C. 154(b) by 0 days.

(21) Appl. No.: 18/574,082

(22) PCT Filed: Mar. 10, 2023

(86) PCT No.: PCT/CN2023/080917
§ 371 (c)(1),
(2) Date: Dec. 26, 2023

(87) PCT Pub. No.: WO2023/226525
PCT Pub. Date: Nov. 30, 2023

(65) Prior Publication Data
US 2024/0263417 A1    Aug. 8, 2024

(30) Foreign Application Priority Data
May 26, 2022    (CN) .......................... 202210586154.8

(51) Int. Cl.
*E02D 7/00*     (2006.01)
*E02D 5/28*     (2006.01)
(Continued)

(52) U.S. Cl.
CPC ............. *E02D 13/00* (2013.01); *E02D 5/285* (2013.01); *E02D 5/72* (2013.01); *E02D 5/805* (2013.01);
(Continued)

(58) Field of Classification Search
CPC ........... E02D 13/00; E02D 5/285; E02D 5/72; E02D 5/805; E02D 7/06; E02D 27/425;
(Continued)

(56) References Cited

U.S. PATENT DOCUMENTS

| 29,921 A | * | 9/1860 | Smith | ..................... E02D 23/06 405/9 |
| 108,814 A | * | 11/1870 | Moseley | ................ E02D 27/20 405/252.1 |

(Continued)

FOREIGN PATENT DOCUMENTS

| CN | 206956717 A | 2/2018 |
| CN | 108049394 A | 5/2018 |

(Continued)

*Primary Examiner* — Edwin J Toledo-Duran
(74) *Attorney, Agent, or Firm* — IPRTOP LLC (57) ABSTRACT

A tool for an offshore wind power foundation pile includes a steel pipe pile, a pile core, a pile cap, and a pile shoe. A cutting shoe portion is arranged at a bottom of the steel pipe pile, and an outer diameter of the pile shoe is larger than an outer diameter of the cutting shoe portion; the pile cap is detachably connected to the top of the steel pipe pile; the pile core is located in the steel pipe pile, the pile core is detachably connected to the pile shoe, and a length of the pile core is larger than or equal to a length of the steel pipe pile; the pile cap is further provided with a pile core accommodating groove and a pile core limiting portion; the pile core limiting portion includes a pile core limiting block and a limiting hole.

8 Claims, 3 Drawing Sheets

(51) Int. Cl.
*E02D 5/72* (2006.01)
*E02D 5/80* (2006.01)
*E02D 7/06* (2006.01)
*E02D 13/00* (2006.01)
*E02D 27/42* (2006.01)
*E02D 27/52* (2006.01)

(52) U.S. Cl.
CPC .............. *E02D 7/06* (2013.01); *E02D 27/425* (2013.01); *E02D 27/525* (2013.01); *E02D 2250/0023* (2013.01); *E02D 2300/002* (2013.01); *E02D 2300/0029* (2013.01); *E02D 2600/30* (2013.01)

(58) Field of Classification Search
CPC .......... E02D 27/525; E02D 2250/0023; E02D 2300/002; E02D 2300/0029; E02D 2600/30
See application file for complete search history.

(56) References Cited

U.S. PATENT DOCUMENTS

| | | | | | |
|---|---|---|---|---|---|
| 185,447 | A | * | 12/1876 | LeConte | F42B 3/00 102/331 |
| 225,061 | A | * | 3/1880 | Johnson | E02D 7/24 175/398 |
| 226,237 | A | * | 4/1880 | Maclay | E02D 5/72 405/255 |
| 228,467 | A | * | 6/1880 | Maclay | E02D 5/72 405/254 |
| 248,702 | A | * | 10/1881 | Button | E02D 7/10 173/132 |
| 262,569 | A | * | 8/1882 | Case | E02D 5/523 405/251 |
| 518,354 | A | * | 4/1894 | Polhamus | E02D 5/60 405/216 |
| 673,443 | A | * | 5/1901 | Mouchel | E02D 5/36 405/239 |
| 673,780 | A | * | 5/1901 | Mouchel | E02D 5/523 405/252 |
| 680,803 | A | * | 8/1901 | Nagy | E02D 5/60 405/224 |
| 714,204 | A | * | 11/1902 | Lindenthal | E21B 7/00 405/137 |
| 724,573 | A | * | 4/1903 | Hartung et al. | E02D 5/60 111/99 |
| 763,212 | A | * | 6/1904 | Shuman | E02D 5/385 175/21 |
| 806,838 | A | * | 12/1905 | Raymond | E02D 5/385 405/243 |
| 825,599 | A | * | 7/1906 | Healy | E02D 5/48 405/253 |
| 825,604 | A | * | 7/1906 | Koetitz | E02D 27/20 405/250 |
| 960,746 | A | * | 6/1910 | Warrington | E02D 13/10 173/130 |
| 967,879 | A | * | 8/1910 | Bilyeu | E02D 7/30 405/246 |
| 1,068,779 | A | * | 7/1913 | Kenny | E02D 5/30 405/257 |
| 1,087,830 | A | * | 2/1914 | Ridley | E02D 5/385 405/243 |
| 1,163,377 | A | * | 12/1915 | Selfridge | E02D 5/30 405/257 |
| 1,416,013 | A | * | 5/1922 | Gieseler | B65G 53/42 406/152 |
| 1,629,622 | A | * | 5/1927 | Hiley | E02D 5/385 405/240 |
| 1,839,304 | A | * | 1/1932 | Finlay | E02D 7/30 405/233 |
| 1,888,073 | A | * | 11/1932 | Collins | E02D 5/60 405/216 |
| 1,912,108 | A | * | 5/1933 | Upson | E02D 7/30 405/245 |
| 2,342,243 | A | * | 2/1944 | Brizay | E02D 7/20 405/226 |
| 2,847,830 | A | * | 8/1958 | Smith | E02D 7/30 405/246 |
| 2,951,681 | A | * | 9/1960 | Degen | E02D 7/28 175/21 |
| 2,952,130 | A | * | 9/1960 | Mueller | E02D 5/50 175/19 |
| 2,961,839 | A | * | 11/1960 | Aresti | E04B 1/36 405/231 |
| 2,996,887 | A | * | 8/1961 | Rice | E02D 7/30 405/245 |
| 3,041,839 | A | * | 7/1962 | Kupka | E02D 7/30 405/247 |
| 3,060,695 | A | * | 10/1962 | McCall | E02D 7/30 405/246 |
| 3,261,412 | A | * | 7/1966 | Lob | E03B 3/12 405/253 |
| 3,316,722 | A | * | 5/1967 | Gibbons | E02D 7/30 405/245 |
| 3,329,216 | A | * | 7/1967 | Warrington | E02D 7/30 173/132 |
| 3,452,830 | A | * | 7/1969 | Mastropole | E02D 7/18 175/55 |
| 3,526,069 | A | * | 9/1970 | Deike | E02D 5/805 405/244 |
| 3,546,885 | A | * | 12/1970 | Pogonowski | E02B 17/00 405/253 |
| 3,585,803 | A | * | 6/1971 | Bardgette | E02D 5/523 285/308 |
| 3,602,000 | A | * | 8/1971 | Meheen | E02D 5/28 52/223.4 |
| 3,628,337 | A | * | 12/1971 | Stepanich | E02D 5/54 405/253 |
| 3,636,718 | A | * | 1/1972 | Keats | E02D 5/32 405/248 |
| 3,638,433 | A | * | 2/1972 | Sherard | E02D 5/72 405/50 |
| 3,646,598 | A | * | 2/1972 | Chelminski | E02D 7/00 175/6 |
| 3,654,767 | A | * | 4/1972 | Cavin | E02D 5/50 405/241 |
| 3,690,110 | A | * | 9/1972 | Wiswell, Jr. | E02D 5/60 264/32 |
| 3,747,690 | A | * | 7/1973 | Deike | E02D 3/046 173/121 |
| 3,748,863 | A | * | 7/1973 | Pogonowski | E02D 5/60 405/251 |
| 3,762,173 | A | * | 10/1973 | Marsh | E02D 5/523 29/523 |
| 3,763,655 | A | * | 10/1973 | Galuska | E02D 5/54 52/158 |
| 3,779,025 | A | * | 12/1973 | Godley | E02D 5/38 405/249 |
| 3,783,624 | A | * | 1/1974 | Nakade | C09K 17/48 405/264 |
| 3,796,055 | A | * | 3/1974 | Mahony | E02D 35/00 405/230 |
| 3,797,585 | A | * | 3/1974 | Ludvigson | E02D 7/02 267/113 |
| 3,800,548 | A | * | 4/1974 | Wisotsky | E02D 7/02 181/119 |
| 3,805,535 | A | * | 4/1974 | Van Weele | E02D 5/385 405/237 |
| 3,808,820 | A | * | 5/1974 | Bodine | E02D 7/18 405/232 |
| 3,817,335 | A | * | 6/1974 | Chelminski | E02D 7/10 173/132 |
| 3,832,858 | A | * | 9/1974 | Anders | E02D 7/26 173/24 |
| 3,832,859 | A | * | 9/1974 | Kanjanavanit | E02D 5/38 52/159 |
| 3,842,917 | A | * | 10/1974 | Wisotsky | E02D 7/00 173/90 |

(56) References Cited

U.S. PATENT DOCUMENTS

| | | | | |
|---|---|---|---|---|
| 3,851,485 A * | 12/1974 | Steding | E02D 15/04 | 222/154 |
| 3,897,835 A * | 8/1975 | Frederick | G01L 1/142 | 173/131 |
| 3,899,891 A * | 8/1975 | Kelly | E02D 5/523 | 405/253 |
| 3,922,869 A * | 12/1975 | Wisotsky | E02D 7/00 | 405/228 |
| 3,925,998 A * | 12/1975 | LeCorgne | E02D 5/385 | 405/242 |
| 3,932,999 A * | 1/1976 | Todd | E02D 7/28 | 405/249 |
| 3,998,063 A * | 12/1976 | Harders | E02D 9/02 | 405/231 |
| 4,009,582 A * | 3/1977 | LeCorgne | E02D 5/385 | 405/240 |
| 4,012,915 A * | 3/1977 | Poma | E02D 5/72 | 405/243 |
| 4,074,912 A * | 2/1978 | Van Bilderbeek | E21B 33/038 | 285/86 |
| 4,086,735 A * | 5/1978 | Adams | E02D 5/805 | 405/259.1 |
| 4,090,364 A * | 5/1978 | Muller | E02D 5/76 | 403/201 |
| 4,102,141 A * | 7/1978 | Ingalls | E02D 5/48 | 405/250 |
| 4,102,143 A * | 7/1978 | Phares | E02B 17/027 | 24/526 |
| 4,230,425 A * | 10/1980 | Gusev | E02D 5/385 | 405/239 |
| 4,265,566 A * | 5/1981 | Scodino | F16L 1/20 | 405/172 |
| 4,272,929 A * | 6/1981 | Hanson | E02D 27/425 | 52/745.18 |
| 4,275,974 A * | 6/1981 | Knox | E02B 17/0008 | 405/227 |
| 4,351,624 A * | 9/1982 | Barber | E02D 7/02 | 405/251 |
| 4,362,439 A * | 12/1982 | Vaynkof | E02D 7/20 | 114/295 |
| 4,405,262 A * | 9/1983 | Nagashima | E02D 13/10 | 52/126.1 |
| 4,426,175 A * | 1/1984 | Lin | E02D 3/12 | 405/269 |
| 4,436,452 A * | 3/1984 | Bodine | E02D 7/18 | 299/14 |
| 4,444,421 A * | 4/1984 | Ahlstone | E21B 17/08 | 285/86 |
| 4,497,376 A * | 2/1985 | Kurylko | E02D 7/125 | 91/47 |
| 4,580,641 A * | 4/1986 | Holland | F02B 71/02 | 173/209 |
| 4,593,944 A * | 6/1986 | Milberger | E02D 5/523 | 285/321 |
| 4,610,465 A * | 9/1986 | Boyadjieff | E02D 5/523 | 285/308 |
| 4,640,118 A * | 2/1987 | Kishida | E02D 1/02 | 73/9 |
| 4,653,595 A * | 3/1987 | Hebert | E02D 13/10 | 173/128 |
| 4,799,829 A * | 1/1989 | Kenny | E21B 29/02 | 30/92 |
| 5,117,924 A * | 6/1992 | Bermingham | E02D 13/10 | 173/210 |
| 5,188,485 A * | 2/1993 | Forster | E02D 5/30 | 405/253 |
| 5,257,879 A * | 11/1993 | Veronelli | E02D 7/28 | 405/232 |
| 5,259,240 A * | 11/1993 | Raines | E02D 1/025 | 73/84 |
| 5,269,630 A * | 12/1993 | Bolin | E02D 35/00 | 405/230 |
| 5,282,701 A * | 2/1994 | An | E02D 5/00 | 405/253 |
| 5,540,523 A * | 7/1996 | Foret, Jr. | E02D 7/00 | 405/232 |
| 5,544,979 A * | 8/1996 | White | E02D 13/02 | 405/249 |
| 5,755,533 A * | 5/1998 | Snyder, Jr. | E02D 27/52 | 405/223.1 |
| 5,904,447 A * | 5/1999 | Sutton | E02D 3/12 | 175/323 |
| 5,975,808 A * | 11/1999 | Fujita | E02D 5/523 | 405/253 |
| 6,047,505 A * | 4/2000 | Willow | E02D 5/54 | 405/253 |
| 6,102,627 A * | 8/2000 | Ueda | E02D 27/34 | 52/167.9 |
| 6,142,712 A * | 11/2000 | White | E02D 7/28 | 405/249 |
| 6,183,167 B1 * | 2/2001 | Ruiz | F16B 7/042 | 405/253 |
| 6,254,314 B1 * | 7/2001 | Park | E02D 5/28 | 403/383 |
| 6,386,295 B1 * | 5/2002 | Suver | E02F 3/962 | 173/1 |
| 6,474,030 B1 * | 11/2002 | Ueda | E02D 27/14 | 52/167.9 |
| 6,719,496 B1 * | 4/2004 | Von Eberstein | B63B 21/22 | 114/296 |
| 7,726,913 B1 * | 6/2010 | Sjogren | E02D 5/385 | 166/334.4 |
| 8,215,874 B2 * | 7/2012 | Reeves | E02D 13/04 | 52/169.9 |
| 8,662,794 B2 * | 3/2014 | Atchley | E02D 13/10 | 403/379.5 |
| 9,109,340 B1 * | 8/2015 | Linn, Jr. | E02D 5/223 | |
| 10,640,945 B1 * | 5/2020 | Niroumand | E02D 5/44 | |
| 2002/0044839 A1 * | 4/2002 | Mosing | E21B 7/20 | 405/231 |
| 2004/0047693 A1 * | 3/2004 | Nishiwaki | E02D 5/523 | 405/250 |
| 2004/0076479 A1 * | 4/2004 | Camilleri | E02D 5/56 | 405/252.1 |
| 2004/0169376 A1 * | 9/2004 | Ruer | E02D 27/425 | 290/55 |
| 2005/0006105 A1 * | 1/2005 | Bell | E02D 27/52 | 166/381 |
| 2005/0031418 A1 * | 2/2005 | Whitsett | E02D 5/54 | 405/252.1 |
| 2005/0074298 A1 * | 4/2005 | Jones | E02D 5/523 | 405/252.1 |
| 2005/0201836 A1 * | 9/2005 | Suver | E02D 7/22 | 405/249 |
| 2007/0017166 A1 * | 1/2007 | Nicolet | E04H 12/223 | 52/155 |
| 2008/0016795 A1 * | 1/2008 | George | E02D 27/16 | 52/309.1 |
| 2008/0170912 A1 * | 7/2008 | Kaufman | E02D 35/005 | 405/232 |
| 2008/0181729 A1 * | 7/2008 | Van Horn | E02D 5/28 | 405/231 |
| 2008/0292407 A1 * | 11/2008 | Jonker | E02D 7/10 | 405/228 |
| 2009/0007502 A1 * | 1/2009 | Roy | E02D 5/80 | 52/159 |
| 2009/0057521 A1 * | 3/2009 | Bootsman | F16L 1/20 | 248/530 |
| 2009/0263189 A9 * | 10/2009 | Koivunen | E04C 3/34 | 403/379.4 |
| 2010/0012336 A1 * | 1/2010 | Adamson | E02D 7/02 | 173/133 |
| 2010/0126079 A1 * | 5/2010 | Kristensen | F03D 13/22 | 52/651.01 |
| 2011/0158752 A1 * | 6/2011 | Hitchin | E02D 7/28 | 405/232 |
| 2011/0194901 A1 * | 8/2011 | Jones | E02D 5/801 | 405/252.1 |

(56) References Cited

U.S. PATENT DOCUMENTS

| | | | |
|---|---|---|---|
| 2011/0200398 A1* | 8/2011 | Collina | E02D 7/20 405/232 |
| 2012/0027527 A1* | 2/2012 | Emanuel | E02D 5/22 405/231 |
| 2012/0087741 A1* | 4/2012 | Desmeules | E02D 27/12 405/253 |
| 2012/0137620 A1* | 6/2012 | Gevers | E04H 12/347 52/651.01 |
| 2012/0213593 A1* | 8/2012 | Vandenbulcke | E02D 13/04 405/227 |
| 2012/0241039 A1* | 9/2012 | Jung | E02D 13/005 137/15.01 |
| 2013/0004243 A1* | 1/2013 | Defrang | E02D 31/002 405/232 |
| 2013/0011203 A1* | 1/2013 | Reinhall | E02D 5/24 405/232 |
| 2013/0028666 A1* | 1/2013 | Atchley | E02D 13/10 405/251 |
| 2013/0189040 A1* | 7/2013 | Atchley | E02D 7/30 405/251 |
| 2014/0056650 A1* | 2/2014 | Reinhall | E02D 5/24 405/253 |
| 2014/0119837 A1* | 5/2014 | Reinhall | E02D 5/72 405/232 |
| 2014/0234030 A1* | 8/2014 | Chin | E02D 5/54 405/244 |
| 2015/0023739 A1* | 1/2015 | Coulon | E02D 5/72 405/233 |
| 2015/0204042 A1* | 7/2015 | Collis | E02D 3/12 405/266 |
| 2016/0010306 A1* | 1/2016 | Reinhall | E02D 13/005 405/228 |
| 2016/0047107 A1* | 2/2016 | Shin | E02D 27/425 405/227 |
| 2016/0251815 A1* | 9/2016 | Rabaron | E02B 17/025 405/227 |
| 2017/0044734 A1* | 2/2017 | Øllgaard | E02D 27/425 |
| 2017/0218590 A1* | 8/2017 | Raposo | E02D 5/00 |
| 2017/0275842 A1* | 9/2017 | Queen | E02D 5/22 |
| 2018/0087232 A1* | 3/2018 | Maersch | E04H 12/2215 |
| 2018/0313052 A1* | 11/2018 | Savinkoff | E02D 7/18 |
| 2019/0071836 A1* | 3/2019 | Gillibrand | E02D 5/56 |
| 2019/0093300 A1* | 3/2019 | Rawlyk | E02D 5/56 |
| 2020/0102715 A1* | 4/2020 | Walliman | E02D 35/005 |
| 2020/0248424 A1* | 8/2020 | Hudson | F24S 25/12 |
| 2020/0308794 A1* | 10/2020 | Genest | E02D 5/223 |
| 2020/0385946 A1* | 12/2020 | Jung | E02B 17/0008 |
| 2021/0010219 A1* | 1/2021 | Kim | E02D 5/58 |
| 2021/0054587 A1* | 2/2021 | Reusing | E02D 5/223 |
| 2021/0372071 A1* | 12/2021 | Yoo | E02D 5/803 |
| 2023/0047667 A1* | 2/2023 | Daysh | E02D 5/56 |
| 2023/0066468 A1* | 3/2023 | Gantt | E02D 27/525 |
| 2023/0119835 A1* | 4/2023 | Brown | E21D 20/003 52/156 |
| 2023/0140266 A1* | 5/2023 | Perko | E02D 27/42 52/155 |
| 2024/0150988 A1* | 5/2024 | Von Deylen | H02S 30/00 |

FOREIGN PATENT DOCUMENTS

| | | |
|---|---|---|
| CN | 108560544 A | 9/2018 |
| CN | 114277797 A | 4/2022 |
| CN | 114411700 A | 4/2022 |
| CN | 115030213 | 9/2022 |
| GB | 190726495 A | 9/1908 |
| JP | H10219683 A | 8/1998 |
| JP | 2001323463 A | 11/2001 |

* cited by examiner

TOOL FOR OFFSHORE WIND POWER FOUNDATION PILE AND METHOD FOR USING SAME

TECHNICAL FIELD

The present disclosure relates to the field of offshore wind power, in particular, to a tool for an offshore wind power foundation pile and a method for using the same.

BACKGROUND OF THE INVENTION

The offshore wind power multi-pile foundation (such as a high-rise pile cap and a jacket foundation) is a foundation type that obtains the bearing capacity by inserting multiple foundation piles into the soil. The multi-pile foundation has the advantages of high overall structural stiffness, wide application range of the water depth, and low requirements on seabed geological conditions, and is widely used in offshore wind power plants in China.

As control conditions, the uplift and compression stability of the foundation piles of the multi-pile foundation generally determines the number, diameter and length of the foundation piles, which directly affects the engineering quantity and cost of the multi-pile foundation. Engineering practice shows that when the diameter of the ordinary steel pipe piles is greater than 1.5 m, the bearing capacity of the end of the pile foundation cannot play a role. In addition, the soil in the foundation piles will be disturbed greatly in the pile sinking process of the pile foundation, and the friction force between the soil in the steel pipe piles and the foundation piles cannot play a role. Therefore, the uplift and compression stability of the steel pipe piles is achieved only by means of the friction force between the outer walls of the foundation piles and the soil around the piles. The compression and uplift stability of the pile foundation is improved only by increasing the diameter and length of the piles in the prior art.

SUMMARY OF THE INVENTION

The present disclosure provides a tool for an offshore wind power foundation pile and a method for using the same.

The tool for the offshore wind power foundation pile includes a foundation module and a pile sinking module, wherein the foundation module includes a steel pipe pile and a pile shoe, the pile sinking module includes a pile core and a pile cap, a cutting shoe portion is arranged at a bottom of the steel pipe pile, and an outer diameter of the pile shoe is larger than an outer diameter of the cutting shoe portion; the pile cap is detachably connected to a top of the steel pipe pile; the pile core is located in the steel pipe pile, the pile core is detachably connected to the pile shoe, and a length of the pile core is larger than or equal to a length of the steel pipe pile; the pile cap is further provided with a pile core accommodating groove and a pile core limiting portion; the pile core accommodating groove communicates with an inner cavity of the steel pipe pile and is configured to accommodate part of the pile core; the pile core limiting portion includes a pile core limiting block and a limiting hole and is configured to adjust a state of the pile core in the pile core accommodating groove and the inner cavity of the steel pipe pile; upon the pile core limiting block being located in a first position, the pile core may freely pass through the pile core accommodating groove and the inner cavity of the steel pipe pile; upon the pile core limiting block being located in a second position, the pile core is fixed to the pile cap, and part of the pile core is located in the pile core accommodating groove; and upon the pile core limiting block being located in a third position, the pile core is located below the pile core limiting block.

Preferably, the pile shoe includes a truncated cone section, and a diameter of the truncated cone section is gradually increased from top to bottom.

Preferably, the pile shoe further includes a connecting section connected to the pile core, and the connecting section is located on the truncated cone section; and the pile core is provided with a claw portion configured to grasp or loosen the connecting section.

Preferably, the pile shoe includes a pile tip section located at a bottom end of the truncated cone section.

Preferably, the pile cap further includes a driving portion located at a top end and a lining portion located at a bottom end and configured to be sleeved in the steel pipe pile, the driving portion is coaxial with the lining portion, and an outer diameter of the lining portion is equal to an inner diameter of the steel pipe pile.

Preferably, the cutting shoe portion includes a plurality of cutting shoes, and the cutting shoes are circumferentially arranged at intervals.

Preferably, the tool includes a first servo linear motion control portion and a second servo linear motion control portion, the first servo linear motion control portion is configured to control a positional change of the pile core limiting block, and the second servo linear motion control portion is configured to control a disconnection or connection between the pile core and the pile shoe.

Preferably, the pile core includes a first pile core section and a second pile core section which are connected to each other, and an end of the second pile core section away from the first pile core section is provided with the claw portion.

A method for using the above tool for the offshore wind power foundation pile includes: S1) connecting the pile core to the pile shoe, and arranging the pile core limiting block in the first position, so that part of the pile core is located in the pile core accommodating groove; then arranging the pile core limiting block in the second position, so that the pile core is fixed to the pile cap; S2) hoisting the tool to a position of the pile shoe making contact with a top surface of a seabed; arranging the pile core limiting block in the first position, lifting the pile cap till the top of the pile core moves to a position below the pile core limiting block, and arranging the pile core limiting block in the third position; S3) hammering the top of the pile cap, so that the tool sinks to the preset position; S4) arranging the pile core limiting block in the first position, disconnecting the pile core from the pile shoe, and hammering the top of the pile cap, so that the steel pipe pile sinks, and the cutting shoes of the bottom cutting shoe portion are expanded outwards in a radial direction of the pile shoe; and S5) uplifting the pile cap and the pile core, and pouring concrete into the steel pipe pile, so that a gap between the steel pipe pile and the pile shoe is closed.

As described above, according to the tool for the offshore wind power foundation pile of the present disclosure, the pile core limiting portion and the pile core are detachably connected to the pile shoe, so that the change of the position of the pile core relative to the pile shoe and the pile cap in the piling process is achieved, thus the stress change of the steel pipe pile in different piling stages is achieved, so that the cutting shoes of the cutting shoe portion of the steel pipe pile are radially expanded outwards when the tool for the foundation pile is located in the preset position, the bottom of the foundation pile is expanded, the foundation area of the soil at the bottom end of the foundation pile is increased, the uplift bearing capacity of the foundation pile is improved, the anchoring effect of the foundation pile in a foundation is enhanced, the size and consumption of the steel pipe pile are reduced, the cost is reduced, and the whole mounting process of the foundation pile is facilitated.

DESCRIPTION OF REFERENCE NUMERALS 100, foundation module; 110, steel pipe pile; 120, cutting shoe portion; 121, cutting shoe; 130, pile shoe; 131, connecting section; 132, truncated cone section; 133, pile tip section; 200, pile sinking module; 210, pile cap; 211, driving portion; 212, lining portion; 213, pile core accommodating groove; 214, pile core limiting portion; 2141, pile core limiting block; 2142, limiting hole; 2143, sliding groove; 2144, first servo linear motion control portion; 220, pile core; 221, first pile core section; 222, second pile core section; 223, claw portion; 2231, second servo linear motion control portion; and 300, concrete.

DETAILED DESCRIPTION

The implementations of the present disclosure are described below in specific embodiments, and a person skilled in the art can easily understand other advantages and functions of the present disclosure from the contents disclosed in this specification.

It should be noted that the structure, proportion and size of drawings in this specification are only used for cooperating with the contents disclosed in this specification so as to be understood and read by a person skilled in the art and are not construed as a limitation on the implementations of the present disclosure and thus have no technical significance. Any modification of the structure or change of the proportion relationship or adjustment of the size without affecting the functions and purposes of the present disclosure shall fall within the scope of the technical contents disclosed by the present disclosure. Meanwhile, terms such as "upper," "lower," "left," "right," and "middle" used in this specification are only used for descriptive purposes and are not intended to limit the scope of the implementations of the present disclosure. The change or adjustment of the relative relation without substantially changing the technical contents shall fall within the scope of the implementations of the present disclosure.

As shown in FIGS. 1 to 6, a tool for an offshore wind power foundation pile according to an embodiment includes a foundation module 100 and a pile sinking module 200. The foundation module 100 includes a steel pipe pile 110 and a pile shoe 130. The pile sinking module 200 includes a pile core 220 and a pile cap 210. In the pile sinking process, the foundation module 100 is ultimately fixed to a seabed, and the bottoms of the pile shoe 130 and the steel pipe pile 110 go deep into the seabed.

Figure 1:
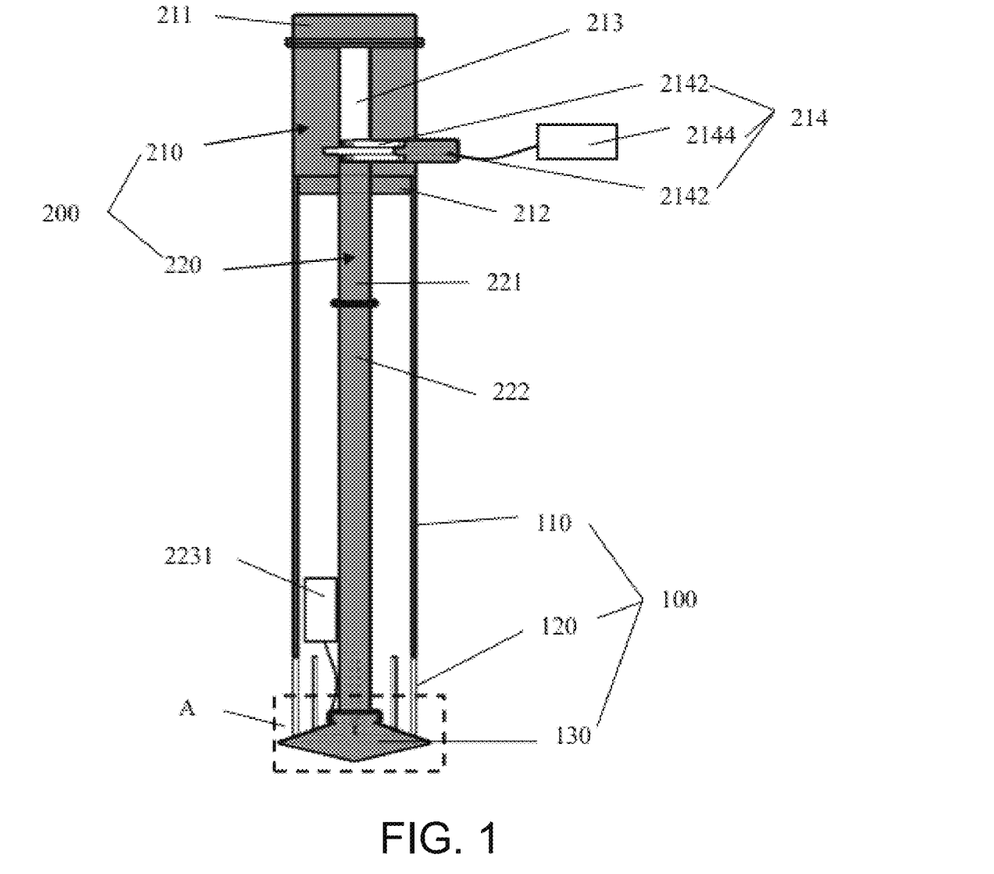
FIG. 1 is a schematic structure diagram of a tool for an offshore wind power foundation pile in the present disclosure.

A cutting shoe portion 120 is arranged at the bottom of the steel pipe pile 110. An outer diameter of the pile shoe 130 is larger than an outer diameter of the cutting shoe portion 120. The pile cap 210 is detachably connected to a top of the steel pipe pile 110. The pile core 220 is located in the steel pipe pile 110. The pile core 220 is detachably connected to the pile shoe 130. A length of the pile core 220 is larger than or equal to a length of the steel pipe pile 110. Therefore, the pile shoe 130 is located below the cutting shoe portion 120.

Figure 3:
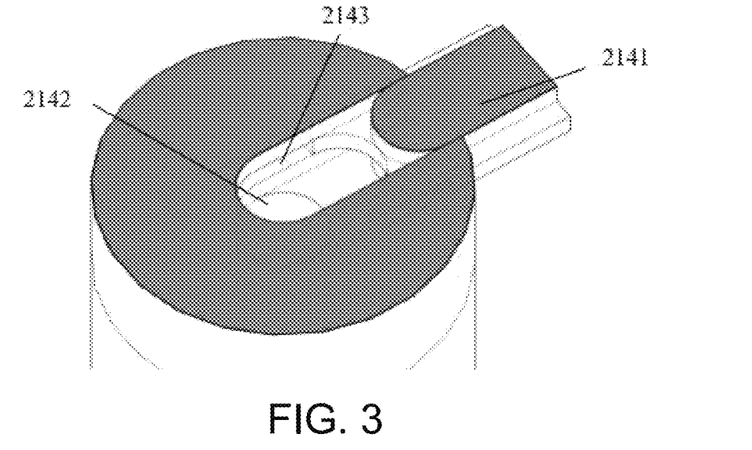
FIG. 3 is a schematic diagram of a pile core limiting block in a pile core limiting portion located in a first position in the present disclosure.
Figure 4:
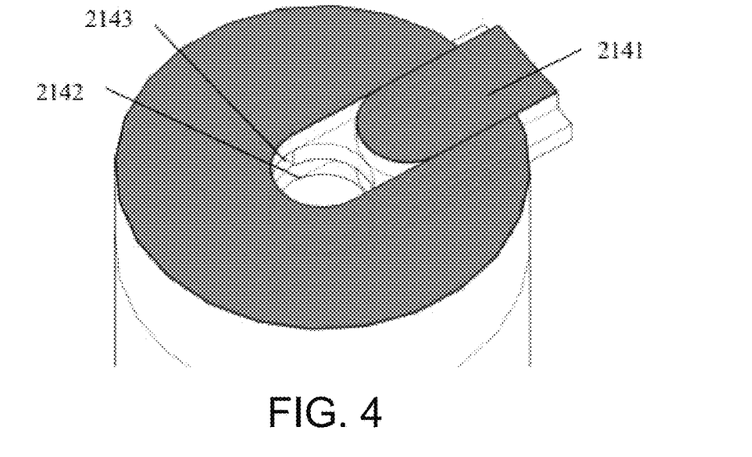
FIG. 4 is a schematic diagram of a pile core limiting block in a pile core limiting portion located in a second position in the present disclosure.
Figure 5:
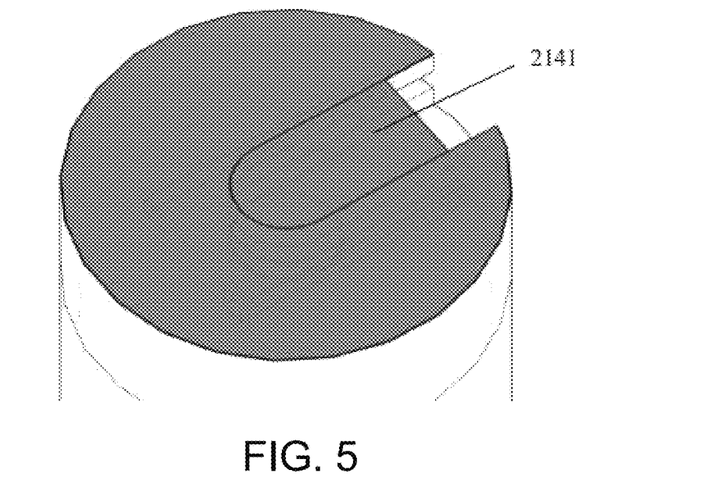
FIG. 5 is a schematic diagram of a pile core limiting block in a pile core limiting portion located in a third position in the present disclosure.

The pile cap 210 is further provided with a pile core accommodating groove 213 and a pile core limiting portion 214. The pile core accommodating groove 213 communicates with an inner cavity of the steel pipe pile 110 and is configured to accommodate part of the pile core 220. The pile core limiting portion 214 includes a pile core limiting block 2141 and a limiting hole 2142. The limiting hole 2142 communicates with the pile core accommodating groove 213 and the inner cavity of the steel pipe pile 110. The pile core limiting block 2141 is configured to open and close the limiting hole 2142. The pile core limiting block 2141 is arranged in three positions. As shown in FIG. 1 and FIG. 3, when the pile core limiting block 2141 is located in a first position, the limiting hole 2142 is fully opened, and the pile core 220 may freely pass through the pile core accommodating groove 213 and the inner cavity of the steel pipe pile 110. As shown in FIG. 1 and FIG. 4, when the pile core limiting block 2141 is located in a second position, the limiting hole 2142 is semi-closed, the pile core 220 is clamped in the limiting hole 2142, and part of the pile core 220 is located in the pile core accommodating groove 213. That is, the pile core 220 located at the limiting hole 2142 is clamped between the pile core limiting block 2141 and a wall of the limiting hole 2142, so that the pile core 220 is fixed to the pile cap 210. As shown in FIG. 1 and FIG. 5, when the pile core limiting block 2141 is located in a third position, the limiting hole 2142 is fully closed, and the pile core 220 is located below the pile core limiting block 2141. In this embodiment, the pile core limiting portion 214 is provided with a sliding groove formed in a radial direction of the pile cap 210 and configured to limit and guide the movement of the pile core limiting block 2141.

According to the present disclosure, the pile core limiting portion 214 and the pile core 220 are detachably connected to the pile shoe 130, so that the change of the position of the pile core 220 relative to the pile shoe 130 and the pile cap 210 in the piling process of the pile core 220 is achieved, thus the stress change of the steel pipe pile 110 in different piling stages is achieved, so that the cutting shoes 121 of the cutting shoe portion 120 of the steel pipe pile 110 are radially expanded outwards when the tool for the foundation pile is located in the preset position, the bottom of the foundation pile is expanded, the anchoring effect of the foundation pile in a foundation is enhanced, the uplift bearing capacity of the foundation pile is improved, and the whole mounting process of the foundation pile is facilitated.

Figure 6:
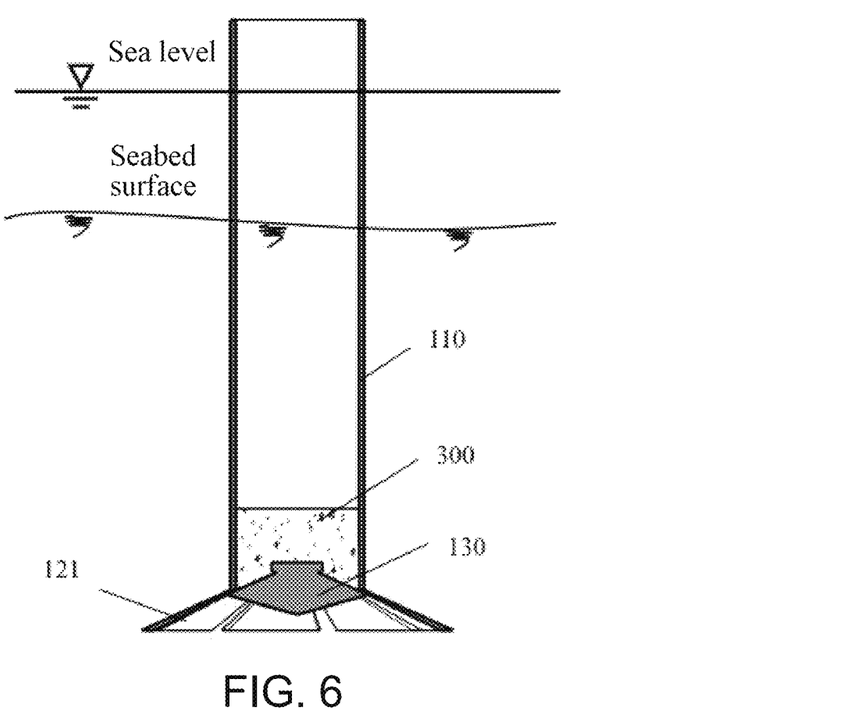
FIG. 6 is a schematic diagram of a tool for an offshore wind power foundation pile anchored under a seabed in the present disclosure.

As shown in FIG. 1 and FIG. 6, specifically, a method for using a tool for an offshore wind power foundation pile is provided according to an embodiment of the present disclosure. The method uses the described tool for the offshore wind power foundation pile, and specifically includes the following steps:

S1) It is confirmed that the pile core 220 is connected to the pile shoe 130, and the pile core limiting block 2141 is arranged in the first position, so that part of the pile core 220 is located in the pile core accommodating groove 213. Then the pile core limiting block 2141 is arranged in the second position, so that the pile core 220 is fixed to the pile cap 210.

S2) The tool is hoisted to a position of the pile shoe 130 making contact with a top surface of a seabed. The pile core limiting block 2141 is arranged in the first position, the pile cap 210 is lifted till the top of the pile core 220 moves to a position below the pile core limiting block 2141, and the pile core limiting block 2141 is arranged in the third position.

S3) The top of the pile core 220 is hammered, so that the tool sinks to a preset position. At this moment, the pile core limiting block 2141 is located in the third position. In the process of hammering the top of the pile cap 210, an upper end of the pile core 220 abuts against a lower end surface of the pile core limiting block 2141. The length of the pile core 220 is greater than or equal to that of the steel pipe pile 110. Therefore, the pile core 220 pushes the pile shoe 130 to continuously drill into the seabed, and the steel pipe pile 110 also continuously goes deep till the pile shoe 130 sinks to the preset position. At this moment, the foundation module 100 is fixed to the seabed.

S4) The pile core limiting block 2141 is arranged in the first position. The pile core 220 is disconnected from the pile shoe 130. The top of the pile cap 210 is hammered. Thus the steel pipe pile 110 sinks, and the cutting shoes 121 of the bottom cutting shoe portion 120 are expanded outwards in a radial direction of the pile shoe 130. When the pile core limiting block 2141 is located in the first position, the top of the pile cap 210 is hammered. The top of the pile core 220 goes deep into the pile core accommodating groove 213. The steel pipe pile 110 continuously goes deep. The position of the pile shoe 130 is relatively fixed, and the pile shoe is located below the steel pipe pile 110. Therefore, the circumferentially distributed cutting shoes 121 of the cutting shoe portion 120 radially extend to form a bottom expansion structure of the foundation pile.

S5) The pile cap 210 and the pile core 220 are uplifted. The pile sinking module 200 is uplifted away from the seabed. Concrete 300 is poured into the steel pipe pile 110, so that a gap between the steel pipe pile 110 and the pile shoe 130 is closed, and pile sinking is achieved. In this step, the pile core limiting block 2141 may be arranged in the first position firstly, so that part of the pile core 220 is located in the pile core accommodating groove 213. Then the pile core limiting block 2141 is arranged in the second position, so that the pile core 220 is fixed to the pile cap 210. Then the whole pile sinking module 200 is uplifted.

The method for using the tool for the offshore wind power foundation pile has the advantages of convenience and simplicity in use. After the tool enters a sea, only the position of the pile core limiting block 2141 and the connecting state of the pile core 220 and the pile shoe 130 need to be adjusted, so that the foundation pile is mounted to the preset position, and the cutting shoe portion 120 is expanded to form the bottom expansion structure of the foundation pile.

Figure 2:
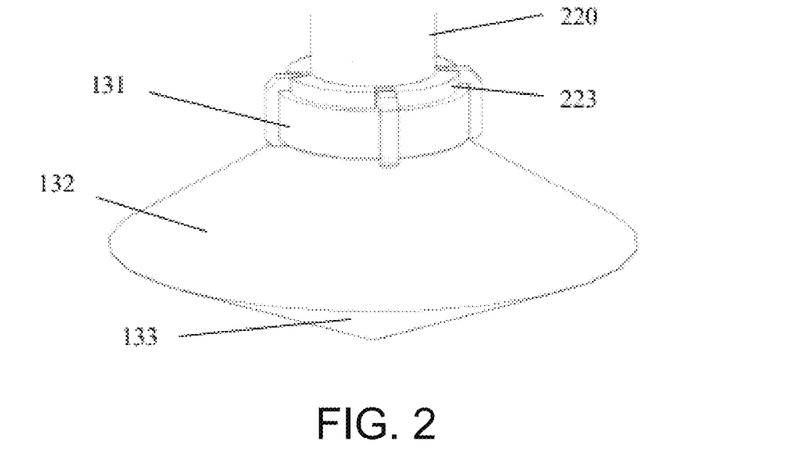
FIG. 2 is an enlarged diagram of an area A in FIG. 1.

As shown in FIG. 2, according to an embodiment of the tool for the offshore wind power foundation pile, the pile shoe 130 includes a truncated cone section 132. The diameter of the truncated cone section 132 is gradually increased from top to bottom. The cutting shoe portion 120 includes a plurality of cutting shoes 121. The cutting shoes 121 are circumferentially arranged at intervals. In the expanding process of the cutting shoe portion 120, the diameter of the truncated cone section 132 is gradually increased from top to bottom so as to guide the cutting shoes 121 to radially expand outwards. Preferably, the cutting shoe portion 120 may be formed by a plurality of elongated grooves which are formed in a circumferential direction of the steel pipe pile 110 and extend in an axial direction of the steel pipe pile 110. These elongated grooves all penetrate through the steel pipe pile 110 in the axial direction.

Preferably, as shown in FIG. 2, the pile shoe 130 further includes a connecting section 131 connected to the pile core 220. The connecting section 131 is located on the truncated cone section 132. The pile core 220 is provided with a claw portion 223 configured to grasp or loosen the connecting section 131. The claw portion 223 is circumferentially and uniformly provided with a plurality of claws which are rotatably connected to the bottom of the pile core 220. The connecting section 131 is provided with a circular cylinder portion. When the pile core 220 is connected to the pile shoe 130, all the claws grasp the circular cylinder portion in an axial direction of the circular cylinder portion. When the pile core 220 needs to be disconnected from the pile shoe 130, free ends of all the claws expand from inside to outside, so that all the claws are disengaged from the circular cylinder portion, and thus the pile core 220 is disconnected from the pile shoe 130. The pile core 220 includes a first pile core section 221 and a second pile core section 222 which are connected to each other. An end of the second pile core section 222 away from the first pile core section 221 is provided with the claw portion 223. Since the geological conditions of different offshore wind turbine positions are different, the depth of a pile foundation in soil is different. Therefore, the pile core 220 is segmented, and only a part of the pile core 220 needs to be replaced for different positions. The second pile core section 222 provided with the claw portion 223 has a relatively complex structure and can be reused.

As shown in FIG. 2, the pile shoe 130 includes a pile tip section 133 located at a bottom end of the truncated cone section 132. In this embodiment, the pile tip section 133 is a closed entity, and enhances the drilling capacity of the pile shoe 130 in the hammering process.

As shown in FIG. 1, the pile cap 210 further includes a driving portion 211 located at a top end and a lining portion 212 located at a bottom end and configured to be sleeved in the steel pipe pile 110. The driving portion 211 is coaxial with the lining portion 212. The outer diameter of the lining portion 212 is equal to the inner diameter of the steel pipe pile 110. During operation, the lining portion 212 is sleeved in the steel pipe pile 110, so that the driving portion 211 is coaxial with the steel pipe pile 110. In the sinking process of the foundation module 100, the steel pipe pile 110 is sleeved over the lining portion 212 so as to be guided. In practical engineering, the pile cap 210 is welded or is in bolted connection to a position below the driving portion 211.

The embodiment of the tool for the offshore wind power foundation pile further includes a first servo linear motion control portion 2144 and a second servo linear motion control portion 2231. The first servo linear motion control portion 2144 is configured to control a positional change of the pile core limiting block 2141. The second servo linear motion control portion 2231 is configured to control a disconnecting or connecting state between the pile core 220 and the pile shoe 130. In specific applications, the pile core limiting block 2141 may be controlled to be located in the first position, the second position and the third position by controlling the first servo linear motion control portion 2144. The claw portion 223 of the pile core 220 is controlled by controlling the second servo linear motion control portion 2231, so that the pile core 220 is controlled to be connected to or disconnected from the pile shoe 130.

The described embodiments are only used for exemplary description of the principles and effects of the present disclosure, and are not intended to limit the present disclosure. Modifications or changes may be made to the described embodiments by any person skilled in the prior art without departing from the spirit and scope of the present disclosure. Therefore, any equivalent modification or change made by a person of ordinary skill in the art without departing from the spirit and technical thought disclosed by the present disclosure shall still fall within the scope of claims of the present disclosure.

The invention claimed is:

1. A method for using the tool for an offshore wind power foundation pile, wherein the offshore wind power foundation comprises a foundation module (100) and a pile sinking module (200), wherein the foundation module (100) comprises a steel pipe pile (110) and a pile shoe (130), and the pile sinking module (200) comprises a pile core (220) and a pile cap (210);

wherein a cutting shoe portion (120) is arranged at a bottom of the steel pipe pile (110), and an outer diameter of the pile shoe (130) is larger than an outer diameter of the cutting shoe portion (120); wherein the pile cap (210) is detachably connected to a top of the steel pipe pile (110); wherein the pile core (220) is located within the steel pipe pile (110), the pile core (220) is detachably connected to the pile shoe (130), and a length of the pile core (220) is larger than or equal to a length of the steel pipe pile (110);

wherein the pile cap (210) is further provided with a pile core limiting portion (214) and a pile core accommodating groove (213) within the pile cap (210) extending in an axial direction; wherein the pile core limiting portion (214) comprises a pile core limiting block (2141) and a limiting hole (2142), and the limiting hole (2142) communicates with the pile core accommodating groove (213) and an inner cavity of the steel pipe pile (110); wherein the pile core limiting block (2141) is configured to open and close the limiting hole (2142), and the pile core limiting block (2141) is configured to be arranged in three positions: upon the pile core limiting block (2141) being located in a first position, the limiting hole (2142) is fully opened, and the pile core (220) is available to freely pass through the pile core accommodating groove (213) and the inner cavity of the steel pipe pile (110); upon the pile core limiting block (2141) being located in a second position, the limiting hole (2142) is semi-closed, the pile core (220) is clamped in the limiting hole (2142), and part of the pile core (220) is located in the pile core accommodating groove (213); and upon the pile core limiting block (2141) being located in a third position, the limiting hole (2142) is fully closed, and the pile core (220) is located below the pile core limiting block (2141);

wherein the method comprises:

1) connecting the pile core (220) to the pile shoe (130), and arranging the pile core limiting block (2141) in the first position, so that part of the pile core (220) is located in the pile core accommodating groove (213); arranging the pile core limiting block (2141) in the second position, so that the pile core (220) is fixed to the pile cap (210);
2) hoisting the tool to a position of the pile shoe (130) making contact with a top surface of a seabed; arranging the pile core limiting block (2141) in the first position, lifting the pile cap (210) till the top of the pile core (220) moves to a position below the pile core limiting block (2141), and arranging the pile core limiting block (2141) in the third position;
3) hammering the top of the pile cap (210), so that the foundation module (100) sinks to a preset position;
4) arranging the pile core limiting block (2141) in the first position, disconnecting the pile core (220) from the pile shoe (130), and hammering the top of the pile cap (210), so that the steel pipe pile (110) sinks, and the cutting shoes (121) of the bottom cutting shoe portion (120) are expanded outwards in a radial direction of the pile shoe (130); and
5) uplifting the pile cap (210) and the pile core (220), and pouring concrete (300) into the steel pipe pile (110), so that a gap between the steel pipe pile (110) and the pile shoe (130) is closed.

2. The method according to claim 1, wherein the pile shoe (130) comprises a truncated cone section (132), and a diameter of the truncated cone section (132) is gradually increased from top to bottom.

3. The method according to claim 2, wherein the pile shoe (130) further comprises a connecting section (131) connected to the pile core (220), and the connecting section (131) is located on the truncated cone section (132); and the pile core (220) is provided with a claw portion (223) configured to grasp or loosen the connecting section (131).

4. The method according to claim 2, wherein the pile shoe (130) comprises a pile tip section (133) located at a bottom end of the truncated cone section (132).

5. The method according to claim 1, wherein the pile cap (210) further comprises a driving portion (211) located at a top end and a lining portion (212) located at a bottom end and configured to be sleeved in the steel pipe pile (110), wherein the driving portion (211) is coaxial with the lining portion (212), and an outer diameter of the lining portion (212) is equal to an inner diameter of the steel pipe pile (110).

6. The method according to claim 1, wherein the cutting shoe portion (120) comprises a plurality of cutting shoes (121) circumferentially arranged at intervals.

7. The method according to claim 1, further comprising:
controlling a positional change of the pile core limiting block (2141) by a first servo linear motion control portion (2144); and
controlling a disconnection or connection between the pile core (220) and the pile shoe (130) by a second servo linear motion control portion (2231).

8. The method according to claim 3, wherein the pile core (220) comprises a first pile core section (221) and a second pile core section (222) which are connected to each other, and an end of the second pile core section (222) away from the first pile core section (221) is provided with the claw portion (223).

* * * * *